April 18, 1944.   J. L. LABOULAIS   2,346,975
DYNAMIC BALANCING
Filed Nov. 26, 1941   2 Sheets-Sheet 1
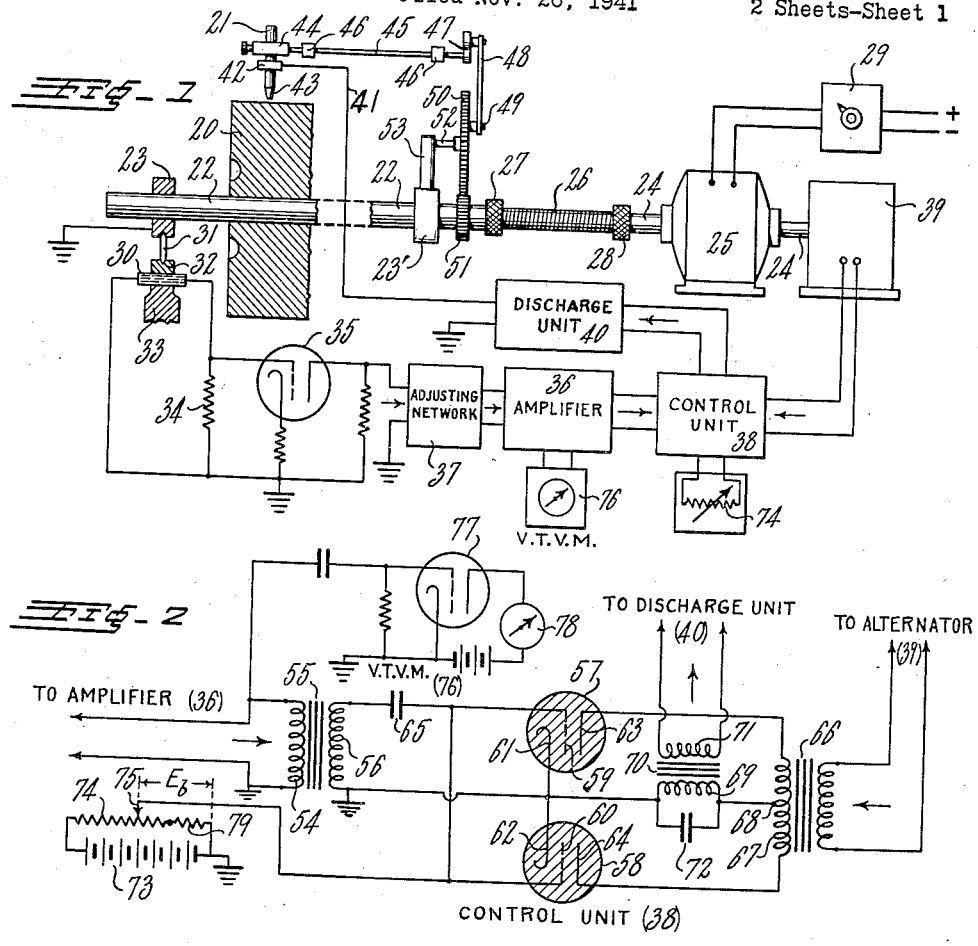
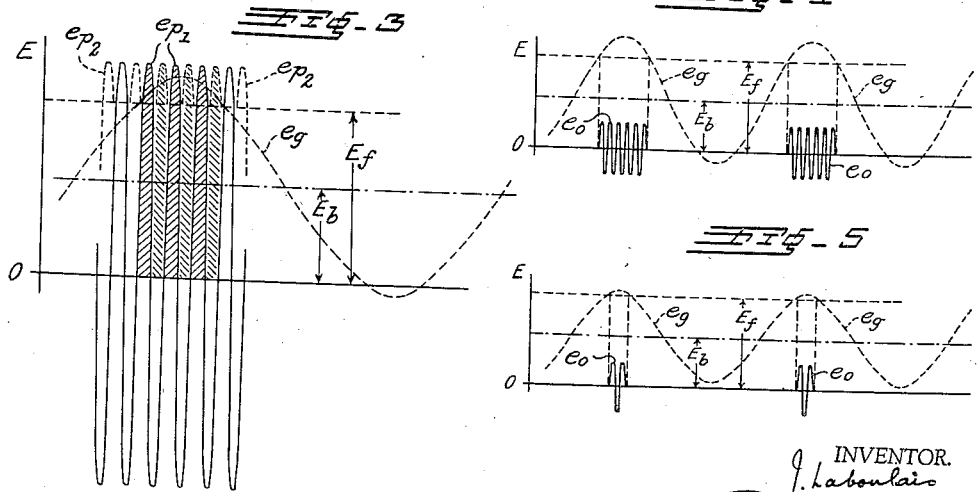
INVENTOR.
J. Laboulais
BY
_____
his ATTORNEYS April 18, 1944. J. L. LABOULAIS 2,346,975
DYNAMIC BALANCING
Filed Nov. 26, 1941 2 Sheets-Sheet 2
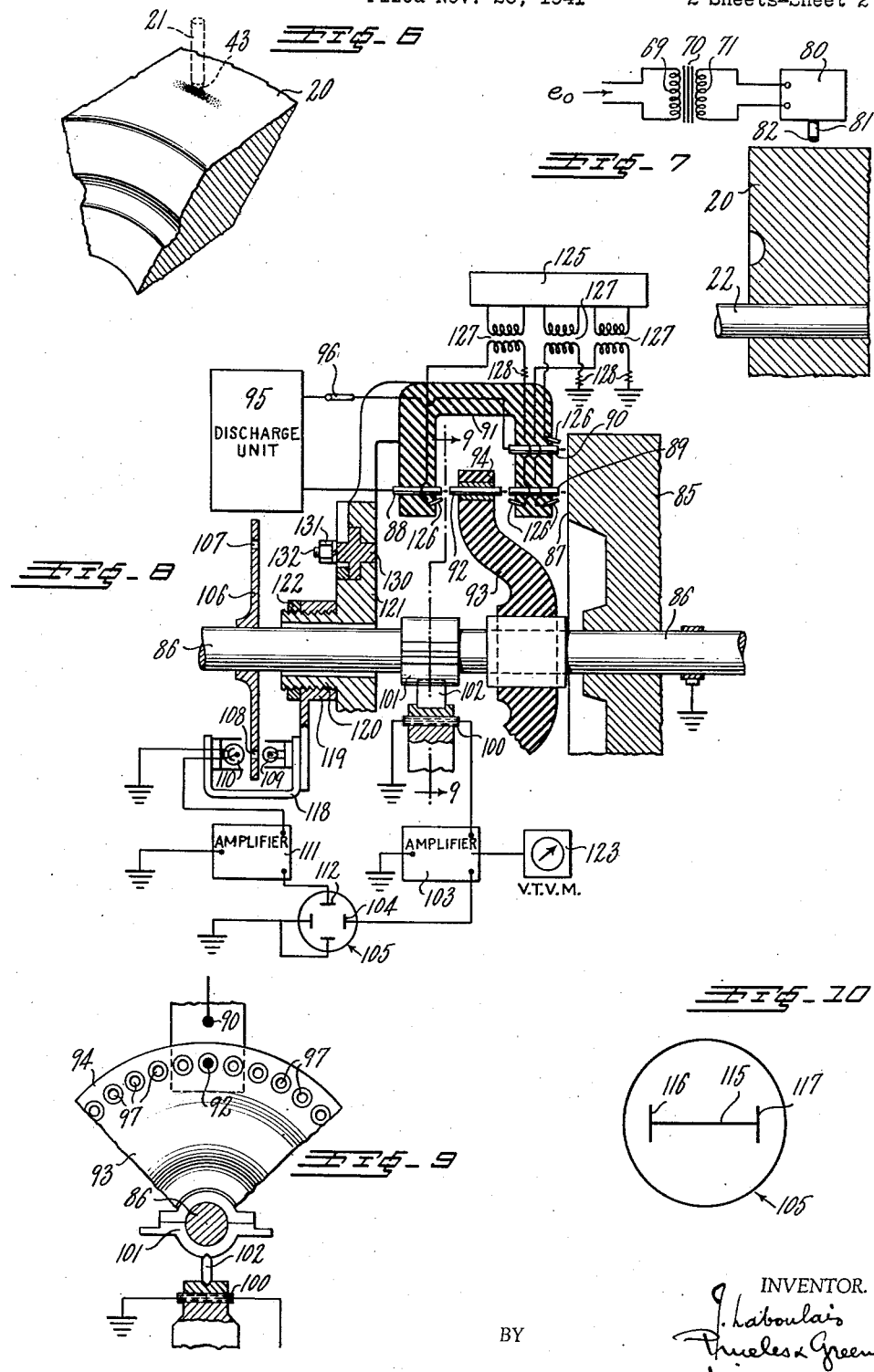
INVENTOR.
J. Laboulais
BY
ATTORNEYS Patented Apr. 18, 1944

2,346,975

UNITED STATES PATENT OFFICE 2,346,975

DYNAMIC BALANCING

Jean L. Laboulais, Greenwich, Conn., assignor to Gyro-Balance Corporation, Greenwich, Conn., a corporation of Delaware Application November 26, 1941, Serial No. 420,473

20 Claims. (Cl. 219—15)

This invention relates to the dynamic balancing of rotating bodies, and more particularly to systems for automatically dynamically balancing a body while it is rotating.

It is the principal object of the present invention to provide means for removing material from a revolving body at the angular position on the body which will result in its substantial dynamical balance. Various systems have been developed in the prior art for ascertaining the angular position on the body of the incremental mass causing its dynamic unbalance in rotation. Examples of such systems are United States Patents No. 2,131,602 to Thearle, No. 2,165,992 to Westendorp, and British Patent No. 399,845 to Taylor. Balancing operations have heretofore been relatively tedious, since the amount of material to be removed from the body had to be determined by successive trial and error attempts. It was necessary to start up and stop the rotating body between the mass removing operations.

In accordance with the present invention means are provided to ascertain the relative magnitude and the angular phase position of the unbalancing mass portion on the rotating body, and to automatically remove the "incremental mass" causing the dynamic unbalance. Dynamic balancing of a body is thus readily performed in a shorter time than heretofore possible, without stopping the body rotation.

My invention utilizes an unbalance detecting or pick-up device, such for example as a piezo-electric crystal actuated by the unbalancing forces exerted thereon through the bearing on which the body rotates. The crystal is mounted so that the magnitude of the pressure exerted thereon by the bearing induces a voltage in the crystal proportional to the pressure forces. It is feasible to mount the crystal so that although the bearing remains in an effectively stationary position and the maximum amplitude of the motion of the bearing is of the order of one-millionth of an inch, a substantial voltage is generated by the crystal proportional to the unbalancing forces exerted on the bearing by the unbalancing element or "incremental mass" of the rotating body.

The voltage developed by the crystal is suitably amplified and impressed upon a control unit that intermittently actuates the "incremental mass" removing element. When the body is metallic, a discharge device may be used to produce an arc discharge from an electrode mounted adjacent the rotating body. The control unit is designed to cause arcing of the electrode at the peripheral portion of the rotating body corresponding to the position of the unbalancing incremental mass thereof. The electric arc evaporates a portion of the metallic body, thereby removing an incremental mass portion that is causing the unbalancing force. Removals of a small mass portion during each revolution of the body gradually brings it into the required degree of dynamic balance. An intermittently operated cutting or abrasive tool may be used in place of the electric arc discharge. Such tool is indicated where the body is non-metallic. The tool is operated by the control unit in a manner to successively remove small mass portions from the revolving body at the peripheral position thereof corresponding to the incremental mass causing the dynamic unbalance.

The control unit establishes the proper peripheral mass removing action on the rotating body through the electrical phase relation of the voltage signal produced by the piezo-electric crystal. Suitable phase adjusting means is used to establish a predetermined relation between the position on the body of the successive material removing action and the phase of the crystal generated signal, as will be described in more detail hereinafter. I also provide a suitable limiting means to stabilize the automatic balancing action of the system, and to prevent the possibility of an excess mass removal from the body beyond that required for the balancing. The incremental mass removing action by the arcing electrode or the cutting or abrasive tool is stopped when the crystal generated signal voltage falls below a predetermined amount. The limiting action is feasible through the use of suitable adjustably biased thyratron discharge tubes, or saturable transformers, in the control unit.

Furthermore, I have found it desirable to prevent the incremental mass removing action from being confined to a very small region or point on the rotating body. It is preferable to extend the mass removing action over a limited portion of the body. This may be accomplished by various expedients. For example, when an arcing electrode is used, a limited swinging or wobbling action may be imparted thereto to periodically shift the phase position of the arcing point with respect to the revolving body. The result is to mechanically extend the arcing action on the body in accordance with the magnitude of the wobbling motion. The result of the arc wobbling action causes the degree of the mass removing action on the body to taper towards the ends of the treated region, which is a desirable result in practice. Another method for somewhat extending the incremental mass removing action over the body is to utilize electronic discharge tubes in the control unit that become conductive above a predetermined crystal voltage signal value, a greater magnitude signal producing a correspondingly greater period of discharge tube firing. The conduction or firing of the discharge tube system is arranged to directly control the period of the arcing, cutting or abrasive action on the rotating body.

The foregoing and other objects and features of the invention will best be understood from the following description of the exemplifications thereof illustrated in the accompanying drawings in which:

Fig. 1 is a diagrammatic representation of one embodiment which the system of my invention may assume in practice;

Fig. 2 is a schematic diagram of a preferred thyratron circuit arrangement for the control unit of Fig. 1;

Figs. 3, 4 and 5 are curves used in describing the electrical action of the control unit.

Fig. 6 is a section of the rotatable body, in perspective, showing a region being removed by an arc discharge;

Fig. 7 is a diagrammatic illustration of a modified arrangement for practicing the invention;

Fig. 8 is a diagrammatic illustration exemplifying a further modification of the present invention;

Fig. 9 is a cross-sectional view taken along the line of 9—9 in Fig. 8;

Fig. 10 shows indications on the screen of a cathode ray tube as used in the system of Fig. 8.

In the form of the invention shown in Fig. 1, a metallic body 20 which is to be balanced is subjected to a controlled intermittent material removing action by an electric current discharge. A relatively stationary electrode 21 is placed adjacent the body 20. The body 20 is rotated by shaft 22 supported in spaced bearings 23, 23'. Shaft 22 is connected to the output shaft 24 of electric motor 25 through flexible cable 26 and associated end-coupling members 27, 28. The speed of motor 25 is controlled by means of a conventional control box 29. A dynamic unbalance in rotating body 20 sets up corresponding vibrational forces in the bearing 23. These forces are transmitted to a piezo-electric crystal 30 through vertical plate 31 and block 32 juxtaposed against crystal 30, which is in turn supported on post 33. With this arrangement, the vertical component of an unbalancing force causes a sinusoidal voltage to be generated by crystal 30 in a predetermined phase relation with respect to the peripheral unbalance region of the rotating body 20, as known to those skilled in the art.

The crystal 30 is connected across grid resistor 34. The crystal generated voltage or unbalance signal is thus impressed upon the input of electronic amplifier tube 35. The amplified sinusoidal signal output of tube 35 is impressed upon an electronic amplifier 36 through an adjusting network 37. The adjusting network 37 includes also a filter to assure sinusoidal wave form of the signal voltage and is provided for the control or adjustment of the relative phase relation of the signal impressed upon amplifier 36, for the reasons to be more apparent hereinafter. The phase adjusted amplified signal is connected to the control unit schematically indicated at 38. An alternating current generator 39 is shown driven by motor 25. It generates a sinusoidal voltage at a frequency substantially higher than that generated by crystal 30. The unbalance signal frequency is equal to the revolutions per second of shafts 22 and 24. The output frequency of alternator 39 is preferably of the order of five to ten times more than that of the unbalance signal. The voltage from alternator 39 is impressed upon control unit 38.

Control unit 38 produces a control signal which operates on discharge unit 40 in a manner to be described in more detail particularly in connection with Figs. 2 to 5. The output of discharge unit 40 is connected to electrode 21 by lead 41 and conducting ring 42. A suitable arc discharge voltage is created between electrode 21 and the grounded rotating metallic body 20. The discharge is produced at short successive intervals, in timed relation with the rotation of body 20 and in correspondence with the space phase position of the unbalance mass portion of the body. More specifically, the system is arranged to cause the successive discharges between electrode 21 and a predetermined peripheral region of the rotating body 20 whereby small portions of the body are evaporated, eliminated or otherwise dissipated, the action being continued until the body is brought into substantial dynamic balance.

A particular physical embodiment of such balancing system of the invention will have a definite and fixed relation between the angular position of the incremental unbalance mass on the body 20 and the phase of the unbalance signal voltage impressed upon initial amplifier stage 35. In the system of Fig. 1, electrode 21 is intended to be positioned opposite the region of body 20 that corresponds to where the angular position of the incremental unbalance mass is when the signal voltage impressed upon control unit 38 has its maximum instantaneous positive value. Also, the control unit 38 functions to strike an arc between electrode 21 and body 20 when the unbalance signal at unit 38 is around its maximum positive value. Network 37 is so arranged and designed as to permit ready adjustment of the electrical phase relation of the signal impressed on amplifier 36 such that the arcing between electrode 21 and body 20 occurs when the angular position of the incremental unbalance mass of the body is substantially coincident with the position of the electrode. The design of adjusting network 37 for this purpose is well known to those skilled in the electrical art, being essentially an electrical signal phase displacing means. The adjustment of the system to effect the angular coincidence for an unknown position of the incremental unbalance mass on a body with the arcing position of electrode 21 is readily effected by an initial adjustment of the network 37 using a rotating body with a known position of its unbalance mass. It is then generally unnecessary to subsequently change the adjustment of network 37 for a given structural arrangement, since this adjustment is independent of the rotating body 20 or its degree of unbalance.

Under particular conditions or system design, a mechanical "wobbling" arrangement may be used to advantage for arc electrode 21 for distributing the mass removing action on body 20 over a limited arcuate region. The arcing point 43 of electrode 21 is caused to oscillate with respect to the surface of body 20 at a frequency suitably lower than the rotation frequency of the body, to produce a desired tapered mass removing action. As shown diagrammatically, electrode 21 is mounted in block 44 from which extends a rod 45. Rod 45, supported in bearings 46, 46, is oscillated by arm 47 extending at the free end of the rod and link 48 pivoted to pin 49 on gear 50. Gear 50 is driven by pinion 51 secured to shaft 22. Gear 50 is mounted on shaft 52 extending from bracket 53 on bearing 23'.

Gear 50 is thus rotated at a slower rate than body 20, effecting an oscillation of electrode point 43 with respect to the surface of the body. When electrode 21 is oscillated in a plane perpendicular to the axis of rotation of body 20, as occurs in Fig. 1, the resulting metal removing action is tapered in effect, extending in the said plane as illustrated in Fig. 6. Depending on the conditions, the "tapered" unbalance mass removal action of the body may be carried out in a direction longitudinal or along an end surface of the body. The result is a relatively smooth body material removal action, without pits or cavities. The treated region may be extended to any degree desired over the body. The amount of material removed per discharge or revolution is preferably relatively small to prevent the formation of craters. The arc discharge voltage is correspondingly adjusted for such result. The air about the electrode point 43 may be maintained in an ionized condition by an auxiliary glow discharge, or the like, in order to cause the main arcing to start at a relatively lower voltage. Also, to prevent overheating of the arcing electrode, and in order to remove the material evaporated by the arc, a suitable blast of air or gas may be maintained in or adjacent a suitable region of the arc discharge.

Fig. 2 is a schematic electrical diagram of one form which control unit 38 may assume in practice. The output of amplifier 36 is connected to primary winding 54 of transformer 55, the secondary winding 56 of which is coupled to the input circuit of two gaseous discharge tubes 57, 58. Gaseous discharge tubes 57, 58 are preferably thyratron tubes comprising control grid or starting anode electrodes 59, 60, cathode electrodes 61, 62 and anode electrodes 63, 64. The ungrounded terminal of secondary winding 56 is coupled to starting electrodes 59, 60 through coupling condenser 65. The cathode electrodes 61, 62 are connected to the ground potential. An alternating voltage from alternator 39 is supplied to the anodes 63, 64 of thyratrons 57, 58 through transformer 66. The outer terminals of secondary winding 67 of transformer 66 are connected to the anodes 63, 64. The thyratron anode circuit is completed to the cathodes 61, 62 through the center-tap 68 of secondary winding 67 and winding 69 of output transformer 70. A by-pass condenser 72 shunts winding 69. The secondary winding of transformer 70 is connected to the discharge unit 40, as shown in Fig. 1.

The crystal generated sinusoidal unbalance signal is directly impressed upon the input of thyratron tubes 57 and 58 in the same phase relationship. Curge $e_g$ of Fig. 3 represents the input or control electrode voltage thus impressed on both discharge tubes 57, 58. The anode voltage originating from source 39 is of a higher frequency than that of signal $e_g$, and is indicated by curve $e_{p1}$ of the thyratrons, a frequency ratio of at least five to one being preferred. If a substantially higher frequency ratio is desired for $e_p$ as compared to the generated crystal signal, a suitable higher ratio gearing may be used between motor shaft 24 and unit 39. Also, the voltage corresponding to source 39 may be provided by an electronic frequency multiplier in place of generator 39. The generated crystal voltage may be multiplied and power amplified, as will be understood by those skilled in the electronic art. The anode voltages applied to discharge tubes 57 and 58 are 180° apart. Curve $e_{p1}$ represents the anode voltage on one thyratron, while incompleted dotted curve $e_{p2}$ represents the phase of the voltage on the second thyratron. An initial direct current biasing potential $E_b$ is provided for starting electrodes 59, 60 of the thyratrons by a suitable means such as the illustrated potentiometer circuit comprising battery 73, variable resistance 74 and movable tap 75. Either thyratron 57, 58 is fired or otherwise rendered conductive when the potential impressed upon its respective control electrode 59, 60 is above a predetermined value and when a sufficiently positive voltage is effective on its respective anode 63, 64. The dotted line at $E_f$ represents the predetermined striking or firing potential for starting electrodes 59, 60 required for a given anode voltage $e_p$, to render the thyratron tubes conductive.

When the positive value of control signal $e_g$ combined with the initial biasing voltage $E_b$ is larger than or above the predetermined voltage $E_f$, the thyratron tubes 57, 58 will be fired during the intervals when their anode voltage is in the positive cycle. In view of the 180° phase displacement of the anode voltages applied to tubes 57, 58 they will be fired successively in half cycles of the higher frequency supply thereto. Thus, the higher frequency cycles during which the thyratrons are fired depends upon the interval during which the instantaneous positive value of the signal applied to the control grids 59, 60 exceeds the predetermined firing potential $E_f$ for the system.

The variable bias control, corresponding to voltage $E_b$ for the input of thyratrons 57, 58 may be applied between the cathode electrode 61, 62 and ground in place of at the grid electrodes 59, 60 as illustrated in Fig. 2. The type of gaseous discharge tube used for 57, 58 may be any suitable one of the available thyratrons, having either a positive or a negative grid-control characteristic. Also, thyratron tubes with an auxiliary shield-grid may be employed. The choice of a particular discharge tube type is dependent upon design considerations for the circuit. Suitable thyratron tubes for this control circuit are, for example, described on pages 422 through 430 in "Theory and Applications of Electron Tubes" by H. J. Reich, published in 1939 by the McGraw-Hill Book Company. Where a positive control-grid action for the thyratrons is utilized suitable grid-current limiting resistors may be inserted in the input circuit thereto. The control unit (38) circuit illustrated in Fig. 2 is to be considered as exemplary of the principles involved, and specific modifications thereof are of course feasible, as will now be understood by those skilled in the art.

For a given magnitude of the control signal $e_g$, the duration of the periodic firing may be controlled by a suitable adjustment of the biasing potential $E_b$ impressed upon grid electrodes 59, 60. This control is effected by altering the position of tap 75 on potentiometer 74. An increase in the value of $E_b$ causes a signal $e_g$ of given value to fire thyratrons 57, 58 during a larger number of the higher frequency half-cycles; a smaller value of $E_b$ correspondingly reduces the duration of the firing. Also, for a fixed biasing voltage $E_b$, a larger amplitude control signal $e_g$ causes the thyratrons to fire for a longer period in each $e_g$ cycle than does a smaller amplitude $e_g$ signal, When the combined maximum value of the control signal voltage $e_g$ and bias voltage $E_b$ impressed on grids 59, 60 is less than the required striking voltage $E_t$, the thyratrons are not fired and no output control signal is applied to transformer 70.

Figs. 4 and 5 diagrammatically illustrate the relative control signals appearing on secondary winding 71 of transformer 70. When the value of the signal impressed upon electrodes 59, 60 exceeds the striking voltage $E_t$, an intermittent output signal $e_o$ results with a substantial component of twice the frequency of the signal $e_p$ impressed on anodes 63, 64. Fig. 4 represents the successive $e_o$ output for signal relations corresponding to those in Fig. 3. Fig. 5 shows the corresponding output signal $e_o$ for a smaller amplitude control signal input $e_g$ with the same bias voltage $E_b$. The resultant output signal $e_o$ of Fig. 5 is of a smaller duration than that of Fig. 4. A similar result occurs when $E_b$ is reduced and $e_g$ is the same. The amplitude of the respective output signals $e_o$ is substantially the same, being independent of the duration. The duration of output signal $e_o$ is controlled by the relative amplitudes of the unbalance voltage producing signal $e_g$, and by the adjusted bias voltage $E_b$, as will now be understood.

The output impulses $e_o$ are impressed upon the discharge unit 40, and control the arc discharge action between electrode 21 and the revolving metallic body 20. It is not considered necessary to show the details of discharge unit 40 since suitable means therefor are well known to those skilled in the electrical art. The discharge unit 40 comprises a suitable arcing voltage source coupled to the striking electrode 21, which source is controlled by signal $e_o$ to produce the arcing discharges only during the existence of the output signal $e_o$. Thus, the arcing, sparking, or metal consuming action by electrode 21 upon metallic body 20 is controlled by control unit 38, which control is in turn dependent upon the amplitude of the initial sinusoidal voltage generated by piezo-electric crystal 30 and the relative value of the bias voltage $E_b$ adjustment. The angular extent of the metal consuming action on body 20 is thus directly dependent upon the duration of the firing of thyratrons 57, 58 in each cycle of the control voltage $e_g$. Since, as hereinabove described, the phase of the generated signal $e_g$ is directly related to the angular phase of rotating body 20, the intermittent discharge action by electrode 21 on body 20 occurs on a definite region of the surface of the body. The affected region will correspond to that from which the incremental mass causing the dynamic unbalance is to be removed. In Fig. 6 this region is indicated at 54 on body 20. The surface extent of the discharge action corresponds to the interval in the positive cycle of signal $e_g$ that causes the discharge of the thyratrons to produce output voltage $e_o$.

The magnitude of the crystal generated unbalance voltage corresponding to $e_g$ is proportional to the mass of the portion causing the dynamic unbalance in body 20, and the speed of rotation of the body. The relative amplitude of the voltage generated by crystal 30 is indicated by vacuum tube voltmeter (V. T. V. M.) 76. A suitable vacuum tube voltmeter 76 is indicated in Fig. 2, comprising triode 77 the input of which is condenser coupled to amplifier 36, and the output circuit of which contains a direct reading meter 78. The degree of dynamic unbalance in rotating body 20 is accordingly directly indicated by readings on meter 78. For a given rotational speed of the body, as determined by the operating position of motor control box 29, the relative effective mass causing the unbalance in the rotating body is proportional to the readings on meter 78.

In operating the automatic corrective balancing system of the present invention, I prefer to start in at a relatively low rotational speed. For a given unbalance and rotational speed, one can readily adjust the cyclic duration of the arcing discharges by electrode 21 through the biasing action of potentiometer 74. As the arcing operation progresses, and the incremental mass unbalance is gradually removed from the proper angular position on the body, the unbalance signal voltage $e_g$ becomes small, correspondingly reducing the cyclic durations. The rotational speed of body 20 is thereupon gradually increased through control box 29, whereupon the unbalance voltage $e_g$ also increases, and the arcing discharge action continues to further correct the unbalance. It will thus be seen that the unbalancing correction operation on the body proceeds automatically, and that as the body 20 is dynamically balanced the signal voltage $e_g$ corresponding to the unbalance reduces in value. It is feasible to automatically increase the rotational speed of motor 25 in correspondence with the decreasing magnitude of the unbalance signal $e_g$ by incorporating a separate control circuit between the output of amplifier 36 and the motor speed control box 29.

In practice I prefer to render the arcing discharge or unbalance correction action ineffective when the unbalance signal voltage $e_g$ falls below a predetermined magnitude when the revolving body rotates at its normal speed. This is accomplished to prevent the possible removal of too much mass from body 20, in which a dynamic unbalance will occur in the opposite sense to the original one. The value of the said residual unbalance voltage $e_g$ can readily be adjusted by the bias control $E_b$. In a particular embodiment, suitable design of the relative values of potentiometer 74, an additional series resistance 79, and the voltage of direct current source 73, as shown in Fig. 2, would expedite the attainment of a desired bias control action.

It is to be understood that in accordance with my invention, the automatic balancing action on the rotating body is not limited to the arcing discharge method. For example, an intermittent cutting or abrasive action may be used. Fig. 7 diagrammatically illustrates a modification of the method used in the system of Fig. 1. An abrasive or cutting tool 81 is substituted for electrode 21. The point 82 of tool 81 is sharp when cutting or scraping is desired, or roughened for abrasive action. When point 82 is pressed against the surface of revolving body 20 it effects the removal of a small portion thereof. Tool 81 is actuated by an electromagnetic unit 80 connected to winding 71 of output transformer 70, the primary winding 69 of which is connected in the circuit of control unit 38 shown in Fig. 2.

The principles underlying the structural design of electromagnetic unit 80 may well be analogous to those followed in a phonograph record cutter unit. Point 82 of tool 81 is pressed against the surface of body 20 in correspondence with the duration of the intermittent output control signal $e_o$ impressed upon unit 80. When the voltage impressed on unit 80 is sinusoidal, tool 81 is vibrated against the surface of body 20 for the duration of the signal corresponding to $e_0$, and at signal frequency. It is feasible to rectify the alternating current input to unit 80 where a direct current motivation of tool 81 is preferred. The use of cutting or abrasive tool 81 in place of an arcing electrode permits the automatic dynamic balancing action of the invention to be effected on non-metallic or non-conductive bodies. It is to be understood that the incremental unbalance mass may in accordance with my invention, be removed from the rotating body from any desired surface region thereof, such as from the outer peripheral, the end surfaces, or even from an internal surface. Also, more than one bearing and crystal location for a body may be used to pick-up the unbalance signal $e_g$.

A further form which my invention may assume in practice is shown in Fig. 8. The rotating body 85 is mounted on a suitably driven shaft 86. The incremental unbalance mass removal action is shown as taking place at an end surface 87 of the body through a multiple series electrical discharge which necessitates a conductive characteristic for the corresponding body surface. The discharge is effected through the electrodes 88, 89 and 90 mounted in relatively stationary insulation member 91, and the movable electrode 92 mounted in a rotating disk 93. Disk 93 is rotated by shaft 86 in correspondence with the rotation of body 85.

Electrode 92 is carried near the periphery 94 of disk 93, and is arranged to pass between spaced electrodes 88 and 89 of member 91. Electrodes 89 and 90 are arranged close to the surface 87 of body 85 upon which the discharge action is to occur. A discharge voltage producing unit 95 is provided for energizing the discharge electrodes and effects the metal consuming discharge. When electrode 92 moves between spaced electrodes 88 and 89, a series discharge circuit is effected from the output of discharge unit 95 across electrodes 88 and 92, from electrode 92 to electrode 89, and from electrode 89 to electrode 90 through conductive surface 87 of body 85. The spacing between stationary electrodes 88 and 89 is designed to prevent a discharge except when movable electrode 92 reaches the position between them, as shown in Fig. 8.

Means are provided for the system of Fig. 8 to adjust the arcing discharge action on body 85 so that it occurs at the angular position thereof which automatically removes the incremental unbalance mass thereof in order to effect the dynamic unbalancing. Movable electrode 92 is placed at the angular position on the peripheral edge 94 of rotating disk 93 corresponding to the angular position of the incremental mass to be removed from body 85. As shown in Fig. 9 a series of holes or openings 97 are provided about peripheral edge 94 containing bushings into which electrode 92 may be inserted. The particular opening 97 into which electrode 92 is positioned is determined by suitable unbalance angular determining means such as that to be herein described.

A piezo-electric crystal 100 is arranged with bearing 101 in which shaft 86 rotates. The unbalanced vibrational forces cause a corresponding pressure force against crystal 100 through slab 102 in a manner similar to the corresponding arrangement of Fig. 1. Crystal 100 is connected to the input of amplifier 103, the output of which connects to a deflecting plate 104 of a cathode ray tube 105. A disk 106 is secured to shaft 86 and rotated with body 85. Two openings 107, 108 near the peripheral edge of disk 106 spaced 180° apart, are arranged to pass between a light source 109 and a photo-electric cell 110. When the light beam from lamp 109 impinges upon photo-electric cell 110 through the respective openings 107, 108, a corresponding electrical impulse is impressed upon amplifier 111. The output of amplifier 111 is connected to a deflecting plate 112 arranged 90° from electrode 104 of cathode ray tube 105.

The signal generated by crystal 100 and amplified by unit 103 produces the horizontal line image 115 on the screen of the cathode ray tube 105. The impulses impressed upon amplifier 111 by photo-electric cell 110 produce the transverse lines 116, 117 on horizontal line 115 dependent upon the relative phase relationship of the signal generated by crystal 100 with respect to the angular position of the lamp 109 and cell 110. When lines 116, 117 occur at the extremities of the horizontal line 115, in the manner shown in Fig. 10, the angular position of the lamp and cell 109, 110 corresponds to the occurrence of the instantaneous maximum and minimum values of the generated sinusoidal unbalance voltage at crystal 100 and amplifier 103. Intermediate positions of transverse lines 116, 117 signify correspondingly different angular positions with respect to the maximum signal values.

Lamp 109 and photo-electric cell 110 are mounted on a common yoke 118 extending from sleeve 119. Sleeve 119 is adjustably mounted on collar 120 extending from frame 121. Frame 121 and collar 120 are spaced from the rotating shaft 86, being stationary with respect thereto. A lock nut 122 is arranged on threaded collar 120 to hold yoke 118 in any desired angular position. In operation of the system of Fig. 8, yoke 118 is displaced angularly until the vertical lines 116 and 117 are at the extremities of the horizontal line 115 on cathode ray tube screen 105, as illustrated in Fig. 10. The setting of yoke 118 determines the angular position on body 85 that the incremental unbalance mass lies, the rotation of body 85 is thereupon stopped. Electrode 92 is then inserted in the opening 97 of disk 93 corresponding to the angular position at which yoke 118 is set. A counter-balancing member is inserted in the opposite 180° position on disk 93, from positioned electrode 92, to avoid a dynamic unbalancing component on the system due to the electrode 92 per se.

In this manner, electrode 92 is positioned in disk 93 opposite the angular position at which the incremental mass causing the dynamic unbalance in body 85 is to be removed. It is to be understood that electrode 92 in disc 93 rotates with body 85, and remains in the said angular relation with the incremental mass. Whenever electrode 92 passes between spaced electrodes 88 and 89, an arc discharge occurs on the conductive surface 87 of body 85. This discharge accordingly occurs at the incremental mass region of body 85, and at each successive rotation, an arc discharge removes a small mass portion therefrom. The angular phase position of the mass to be removed, controlled by the angular location of the positioned electrode 92, properly effects the automatic removal of the excess mass of body 85 until it is in dynamic balance. The arcing discharge occurs on body 85 at the regions where the two electrodes 89 and 90 coact with it. The metal removing action is continued until the dynamic unbalance vibration or forces are reduced to a desired minimum value, as ascertained by the reading on the vacuum tube voltmeter 123, coupled to the generated unbalance signal amplifier 103.

An auxiliary sparking voltage generator indicated schematically at 125 is preferably provided to maintain the air around the arcing electrodes in an ionized condition to facilitate the arcing discharge by the electrodes. Sparking voltage unit 125 is coupled to auxiliary point electrodes 126 adjacent the discharge region of the series electrode arrangement 88—92—88—90, through separate coupling transformers 127 and limiting resistors 128. Where it is desirable to "wobble" the arcing discharge action on body 85 to avoid concentration of the mass removal thereon, for the reasons hereinabove described in connection with Fig. 1, electrode supporting member 91 is slidably mounted on frame 121 by member 130. A reciprocating connecting rod, indicated at 131, is coupled to a post 132 extending from member 130 to execute the wobbling action on member 91. The driving arrangement for connecting rod 131 is not shown, but is readily understood by those skilled in the art.

The system of my invention for automatically removing the incremental mass causing dynamic unbalance in a revolving body has many commercial applications. It may for example be used for automatically balancing the rotors of motors, generators, turbines, gyroscopes, and the like. It may also be used for automatically dynamically balancing bodies having non-circular peripheries, such as propellers, where the removal of the material is confined to only a special peripheral portion of the non-circular body. The peripheral location of the discharge electrode with respect to the non-circular rotating body may be determined by stroboscopic means.

The principles underlying the invention, namely, the automatic actuation of mass removing means for removing a mass element of a rotating revolving body that is to be balanced as it is being revolved, may be also carried out in different other ways than those described above. Thus, I contemplate as one phase of the invention the following embodiment thereof:

Assuming a revolving body, for instance, a cylindrical body with a flat end surface from which the material is to be removed. On a suitable support adjustably mounted in the space adjacent the end surface of the revolving body is held a vibratory member supporting in a vibratory position a mass removing element, for instance, an abrasive unit, which is combined with two guide and supporting elements which are held at all times in engagement with the revolving surface from which the material is to be removed. The abrasive unit, together with the associated guide elements, may, for instance, be mounted on the end of a vibratory reed. The vibratory reed, or, in general, the vibratory abrasive unit carrier, is excited by an alternating voltage, for instance, of a frequency equal to the number of revolutions of the revolving body, so as to cause the abrasive unit to engage a peripheral portion of the revolving surface from which the material is to be removed once during each revolution. Suitable phase controlling and adjusting means, such as a suitable circuit, is combined with the alternating voltage supply to the reed, and so automatically controlled in a manner similar to that described in the exemplifications of the invention illustrated in the drawings as to assure that the abrasive unit comes into engagement with the peripheral surface portion of the body from which the material is to be removed in order to balance it once during each revolution.

The guide elements associated with the abrasive unit are yieldably, for instance, elastically yieldably associated with the abrasive unit so as to assure that under the action of the alternating control voltage applied to the vibratory carrier, the abrasive unit comes into engagement with the surface from which the material is to be removed at the proper peripheral portion thereof. Various known mechanical vibrating systems may be utilized for carrying into effect the automatic mechanical balancing system thus herein described.

Another phase of the invention involves the following modification of the embodiment thereof disclosed in connection with Fig. 1: The amplifier 36 is so arranged and combined with means for rectifying a component of the output and impressing the rectified component on an input stage thereof as to assure that only one-half of each sinusoidal wave impressed on the amplifier is retained and amplified, means being also provided that only a predetermined portion of the rectified voltage wave above a certain adjustable level regulated by adjusting means combined with the amplifier is actually delivered as output.

In other words, the amplifier is so designed that each signal wave impressed on its input has only one-half wave impressed on the output side and only that portion of the half wave is delivered at the output side which exceeds a predetermined voltage that is adjustable by adjusting means combined with the amplifier. The output side of the amplifier will thus deliver one voltage impulse during each revolution of the revolving body only to the extent that the body is unbalanced and corresponding to the phase of the unbalance. The output voltage of the amplifier is impressed on a conventional gaseous tube discharge unit, for instance, a thyratron. The thyratron circuit is so arranged that its control electrode is biased so as to interrupt its discharge circuit if the signal voltage impressed thereon it by the amplifier falls below a predetermined adjustable value and to cause firing and a discharge only during the period while the impressed voltage of the amplifier is above the predetermined bias. Such arrangement will likewise automatically control the discharge current delivered by the thyratron circuit to the discharge electrode, which may be arranged in the manner shown in Fig. 1 for removing the mass element from the revolving body during each revolution thereof at the proper position from which it is to be removed.

In the last described embodiment of the invention, the thyratron circuit is supplied from a direct current source and its periodic discharges are impressed on the electrode discharge circuit of electrode 21, Fig. 1, through a suitable transformer.

Various other modifications of the invention will suggest themselves to those skilled in the art. It is accordingly desired that in construing the breadth of the appended claims they shall not be limited to the specific details shown and described in connection with the exemplifications thereof.

What I claim is:

1. In an arrangement for dynamically balancing a rotating body having an angular unbalancing region: supporting means including a solid member for supporting the body so as to substantially prevent vibratory motion thereof while it is rotated; vibratory translating means including a mechano-electrical transducing element actuated by periodic vibratory unbalance forces exerted by said body on said member for producing a corresponding periodic unbalance potential; removing means including a body removing electrode element held in a predetermined position opposite a peripheral portion of said body and operable to maintain a gaseous electric discharge at an adjacent portion of said body for removing material therefrom; and energizing means having a control circuit interconnected between said translating means and said removing means and actuable to periodically operate said removing means in response to the actuation of said translating means by an unbalance force for causing said removing element to periodically remove material from an angular region of said body correlated in a predetermined manner to said periodic unbalance potential; said control circuit including means settable to maintain the phase relation between the material removing period and the unbalance potential period so that the periodic removal of the material causes a decrease of the unbalancing forces.

2. In an arrangement for dynamically balancing a rotating body having an angular unbalancing region: supporting means including a solid member for supporting the body so as to substantially prevent vibratory motion thereof while it is rotated; vibratory translating means including a mechano-electrical transducing element actuated by periodic vibratory unbalance forces exerted by said body on said member for producing a periodic unbalance potential corresponding in phase and magnitude to the dynamic unbalance of said body; removing means including a body removing electrode element held in a predetermined position opposite a peripheral portion of said body and operable to maintain a gaseous electric discharge at an adjacent portion of said body for removing material therefrom; and energizing means having a control circuit interconnected between said translating means and said removing means and actuable to periodically operate said removing means in response to the actuation of said translating means by an unbalance force for causing said removing element to periodically remove material from an angular region of said body correlated in a predetermined manner to said periodic unbalance potential; said control circuit including phase-shifting circuit means adjustable to maintain the phase relation between the material removing period and the unbalance potential period so that the periodic removal of the material causes a decrease of the unbalancing forces.

3. In an arrangement for dynamically balancing a rotating body having an angular unbalancing region: supporting means including a solid member for supporting the body so as to substantially prevent vibratory motion thereof while it is rotated; vibratory translating means including a mechano-electrical transducing element actuated by periodic vibratory unbalance forces exerted by said body on said member for producing a periodic unbalance potential corresponding in phase and magnitude to the dynamic unbalance of said body; removing means including a body removing electrode element held in a predetermined position opposite a peripheral portion of said body and operable to maintain a gaseous electric discharge at an adjacent portion of said body for removing material therefrom; and energizing means having a control circuit interconnected between said translating means and said removing means and actuable to periodically operate said removing means in response to the actuation of said translating means by an unbalance force for causing said removing element to periodically remove material from an angular region of said body correlated in a predetermined manner to said periodic unbalance potential; said control circuit including means settable to maintain the phase relation between the material removing period and the unbalance potential period so that the periodic removal of the material causes a decrease of the unbalancing forces; said energizing means including means operative to automatically decrease the angular region from which the material is removed in response to a decrease in the unbalancing forces.

4. In an arrangement for dynamically balancing a rotating body having an angular unbalancing region: supporting means including a solid member for supporting the body so as to substantially prevent vibratory motion thereof while it is rotated; vibratory translating means including a mechano-electrical transducing element actuated by periodic vibratory unbalance forces exerted by said body on said member for producing a periodic unbalance potential corresponding in phase and magnitude to the dynamic unbalance of said body; removing means including a body removing electrode element held in a predetermined position opposite a peripheral portion of said body and operable to maintain a gaseous electric discharge at an adjacent portion of said body for removing material therefrom; and energizing means having a control circuit interconnected between said translating means and said removing means and actuable to periodically operate said removing means in response to the actuation of said translating means by an unbalance force for causing said removing element to periodically remove material from an angular region of said body correlated in a predetermined manner to said periodic unbalance potential; said control circuit including phase-shifting circuit means adjustable to maintain the phase relation between the material removing period and the unbalance potential period so that the periodic removal of the material causes a decrease of the unbalancing forces; said energizing means including means operative to automatically decrease the angular region from which the material is removed in response to a decrease in the unbalancing forces.

5. A dynamic balancing arrangement as defined by claim 17, characterized by the fact that said removing means include means for oscillating said body removing element with respect to said body to effect removal of material therefrom by an extended tapered removal action.

6. A dynamic balancing arrangement as defined by claim 1, characterized by the fact that said removing means include means for oscillating said electrode element with respect to said body to effect removal of material therefrom by an extended tapered removal action.

7. A dynamic balancing arrangement as defined by claim 17, characterized by the fact that said energizing means include a source of alternating voltage of a frequency substantially higher than the frequency of said unbalance potential and a control unit having gaseous discharge tube means responsive to said unbalance potential and said alternating voltage for controlling the operation of said removing means.

8. A dynamic balancing arrangement as defined by claim 1, characterized by the fact that said energizing means include a source of alternating voltage of a frequency substantially higher than the frequency of said unbalance potential and a control unit having gaseous discharge tube means responsive to said unbalance potential and said alternating voltage for controlling the operation of said removing means.

9. A dynamic balancing arrangement as defined by claim 17, characterized by the fact that said energizing means include a source of alternating voltage of a frequency substantially higher than the frequency of said unbalance potential and a control unit having gaseous discharge tube means responsive to said unbalance potential and said alternating voltage for controlling the operation of said removing means; said control unit including means for controlling the relative periodic extent of the discharge tube firing by said potential for correspondingly controlling the actuation of said removing means.

10. A dynamic balancing arrangement as defined by claim 1, characterized by the fact that said energizing means include a source of alternating voltage of a frequency substantially higher than the frequency of said unbalance potential and a control unit having gaseous discharge tube means responsive to said unbalance potential and said alternating voltage for controlling the operation of said removing means; said control unit including means for controlling the relative periodic extent of the discharge tube firing by said potential for correspondingly controlling the actuation of said removing means.

11. A dynamic balancing arrangement as defined by claim 17, characterized by the fact that it includes adjustable means for rendering the operation of said removing means ineffective below a predetermined magnitude of said unbalance potential.

12. A dynamic balancing arrangement as defined by claim 1, characterized by the fact that it includes adjustable means for rendering the operation of said removing means ineffective below a predetermined magnitude of said unbalance potential.

13. A dynamic balancing arrangement as defined by claim 17, characterized by the fact that said energizing means include a source of alternating voltage of a frequency substantially higher than the frequency of said unbalance potential and a control unit having gaseous discharge tube means responsive to said unbalance potential and said alternating voltage for controlling the operation of said removing means; and adjustable means for rendering the operation of said control unit ineffective below a predetermined magnitude of said unbalance potential.

14. A dynamic balancing arrangement as defined by claim 1, characterized by the fact that said energizing means include a source of alternating voltage of a frequency substantially higher than the frequency of said unbalance potential and a control unit having gaseous discharge tube means responsive to said unbalance potential and said alternating voltage for controlling the operation of said removing means; and adjustable means for rendering the operation of said control unit ineffective below a predetermined magnitude of said unbalance potential.

15. A dynamic balancing arrangement as defined by claim 17, characterized by the fact that said energizing means include a source of alternating voltage of a frequency substantially higher than the frequency of said unbalance potential and a control unit having gaseous discharge tube means responsive to said unbalance potential and said alternating voltage for controlling the operation of said removing means; said control unit including means for controlling the relative periodic extent of the discharge tube firing by said potential for correspondingly controlling the actuation of said removing means; and adjustable means for rendering the operation of said control unit ineffective below a predetermined magnitude of said unbalance potential.

16. A dynamic balancing arrangement as defined by claim 1, characterized by the fact that said energizing means include a source of alternating voltage of a frequency substantially higher than the frequency of said unbalance potential and a control unit having gaseous discharge tube means responsive to said unbalance potential and said alternating voltage for controlling the operation of said removing means; said control unit including means for controlling the relative periodic extent of the discharge tube firing by said potential for correspondingly controlling the actuation of said removing means; and adjustable means for rendering the operation of said control unit ineffective below a predetermined magnitude of said unbalance potential.

17. In an arrangement for dynamically balancing a rotating body having an angular unbalancing region: supporting means including a solid member for supporting the body so as to substantially prevent vibratory motion thereof while it is rotated; vibratory translating means including a mechano-electrical transducing element actuated by periodic vibratory unbalance forces exerted by said body on said member for producing a corresponding periodic unbalance potential; removing means including a body removing element held in a predetermined position opposite a peripheral portion of said body and operable to controllably remove material from an adjacent portion of said body; and energizing means having a control circuit interconnected between said translating means and said removing means and actuable to periodically operate said removing means in response to the actuation of said translating means by an unbalance force for causing said removing element to periodically remove material from an angular region of said body correlated in a predetermined manner to said periodic unbalance potential; said control circuit including means settable to maintain the phase relation between the material removing period and the unbalance potential period so that the periodic removal of the material causes a decrease of the unbalancing forces.

18. In an arrangement for dynamically balancing a rotating body having an angular unbalancing region: supporting means including a solid member for supporting the body so as to substantially prevent vibratory motion thereof while it is rotated; vibratory translating means including a mechano-electrical transducing element actuated by periodic vibratory unbalance forces exerted by said body on said member for producing a periodic unbalance potential corresponding in phase and magnitude to the dynamic unbalance of said body; removing means including a body removing element held in a predetermined position opposite a peripheral portion of said body and operable to controllably remove material from an adjacent portion of said body; and energizing means having a control circuit interconnected between said translating means and said removing means and actuable to periodically operate said removing means in response to the actuation of said translating means by an unbalance force for causing said removing element to periodically remove material from an angular region of said body correlated in a predetermined manner to said periodic unbalance potential; said control circuit including phase-shifting circuit means adjustable to maintain the phase relation between the material removing period and the unbalance potential period so that the periodic removal of the material causes a decrease of the unbalancing forces.

19. In an arrangement for dynamically balancing a rotating body having an angular unbalancing region: supporting means including a solid member for supporting the body so as to substantially prevent vibratory motion thereof while it is rotated; vibratory translating means including a mechano-electrical transducing element actuated by periodic vibratory unbalance forces exerted by said body on said member for producing a periodic unbalance potential corresponding in phase and magnitude to the dynamic unbalance of said body; removing means including a body removing element held in a predetermined position opposite a peripheral portion of said body and operable to controllably remove material from an adjacent portion of said body; and energizing means having a control circuit interconnected between said translating means and said removing means and actuable to periodically operate said removing means in response to the actuation of said translating means by an unbalance force for causing said removing element to periodically remove material from an angular region of said body correlated in a predetermined manner to said periodic unbalance potential; said control circuit including means settable to maintain the phase relation between the material removing period and the unbalance potential period so that the periodic removal of the material causes a decrease of the unbalancing forces; said energizing means including means operative to automatically decrease the angular region from which the material is removed in response to a decrease in the unbalancing forces.

20. In an arrangement for dynamically balancing a rotating body having an angular unbalancing region: supporting means including a solid member for supporting the body so as to substantially prevent vibratory motion thereof while it is rotated; vibratory translating means including a mechano-electrical transducing element actuated by periodic vibratory unbalance forces exerted by said body on said member for producing a periodic unbalance potential corresponding in phase and magnitude to the dynamic unbalance of said body; removing means including a body removing element held in a predetermined position opposite a peripheral portion of said body and operable to controllably remove material from an adjacent portion of said body; and energizing means having a control circuit interconnected between said translating means and said removing means and actuable to periodically operate said removing means in response to the actuation of said translating means by an unbalance force for causing said removing element to periodically remove material from an angular region of said body correlated in a predetermined manner to said periodic unbalance potential; said control circuit including phase-shifting circuit means adjustable to maintain the phase relation between the material removing period and the unbalance potential period so that the periodic removal of the material causes a decrease of the unbalancing forces; said energizing means including means operative to automatically decrease the angular region from which the material is removed in response to a decrease in the unbalancing forces.

JEAN L. LABOULAIS.